United States Patent
Perelman et al.

(10) Patent No.: US 7,870,477 B2
(45) Date of Patent: Jan. 11, 2011

(54) METHOD AND SYSTEM FOR PORTABLE DATA AGGREGATION

(75) Inventors: Roberto Perelman, Sunnyvale, CA (US); Yuan Sheng Fu, Sunnyvale, CA (US); Robert K. McAfee, San Jose, CA (US); Heather Winkle, Los Gatos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1201 days.

(21) Appl. No.: 11/495,833

(22) Filed: Jul. 28, 2006

(65) Prior Publication Data

US 2008/0028333 A1    Jan. 31, 2008

(51) Int. Cl.
    *G06F 17/21* (2006.01)
(52) U.S. Cl. .................. 715/221; 715/224; 715/225; 715/226
(58) Field of Classification Search .......... 715/221, 715/224, 225, 226
    See application file for complete search history.

(56) References Cited

U.S. PATENT DOCUMENTS

| | | | | |
|---|---|---|---|---|
| 7,062,706 | B2 * | 6/2006 | Maxwell et al. | 715/224 |
| 7,500,178 | B1 * | 3/2009 | O'Donnell | 715/221 |
| 2002/0125713 | A1 | 9/2002 | Raab | |
| 2003/0055723 | A1 | 3/2003 | English et al. | |
| 2005/0251733 | A1 | 11/2005 | Elkady | |
| 2006/0138236 | A1 | 6/2006 | Hepworth et al. | |
| 2006/0179003 | A1 | 8/2006 | Steele et al. | |
| 2007/0055596 | A1 | 3/2007 | Yankovich et al. | |
| 2007/0198478 | A1 | 8/2007 | Yu et al. | |
| 2008/0028332 | A1 | 1/2008 | Perelman et al. | |

FOREIGN PATENT DOCUMENTS

| | | |
|---|---|---|
| WO | WO-2008013855 A2 | 1/2008 |
| WO | WO-2008013855 A3 | 1/2008 |
| WO | WO-2008013889 A2 | 1/2008 |
| WO | WO-2008013889 A3 | 1/2008 |

OTHER PUBLICATIONS

"U.S. Appl. No. 11/495,832, Non-Final Office Action mailed Jun. 25, 2008", 12 pgs.
"International Application Serial No. PCT/US07/16734 Written Opinion mailed Jul. 21, 2008", 6 pgs.
"International Application Serial No. PCT/US07/16798, International Search Report mailed May 1, 2008", 4 pgs.
"International Application Serial No. PCT/US07/16798, Written Opinion mailed May 1, 2008", 7 pgs.

(Continued)

*Primary Examiner*—Joshua D Campbell
(74) *Attorney, Agent, or Firm*—Schwegman, Lundberg & Woessner, P.A.

(57) ABSTRACT

A system for portable data aggregation may include a communications module to receive an electronic form, an extractor to extract field data from the electronic form, an aggregator to associate the field data with an aggregate package. The system may further include a characterization module. The characterization module may be configured to preserve visual presentation of the electronic form. The field data may be presented in the aggregate package in an aggregated format.

16 Claims, 6 Drawing Sheets

OTHER PUBLICATIONS

Lynch, Jerome Peter, et al., "Embedding damage detection algorithms in a wireless sensing unit for operational power efficiency", *In smart materials and structures*; vol. 13(4), (Aug 2004), 800-810.

"U.S. Appl. No. 11/495,832 , Final Office Action mailed Apr. 7, 2010", 20.

"U.S. Appl. No. 11/495,832, Final Office Action mailed Jun. 4, 2009", 16 pgs.

"U.S. Appl. No. 11/495,832, Non-Final Office Action mailed Oct. 2, 2009", 18 Pgs.

"U.S. Appl. No. 11/495,832, response filed Oct. 27, 2008 to Non-Final Office Action mailed Jun. 25, 2008", 15 pgs.

"U.S. Appl. No. 11/495,832, Response filed Jan. 4, 2010 to Non Final Office Action mailed Oct. 2, 2009", 12 pgs.

"U.S. Appl. No. 11/495,832, Response filed Sep. 4, 2009 to Final Office Action mailed Jun. 4, 2009", 10 pgs.

\* cited by examiner

HOLIDAY VACATION FORM

| | |
|---|---|
| NAME | BENJAMIN MARTIN |
| STREET ADDRESS | 19121 EVELYN AVENUE |
| CITY | SUNNYVALE |
| STATE | CA |
| ZIP | 94086 |
| DAYTIME PHONE | 408-376-5400 |

FIGURE 4

| AGGREGATED FORM | | | | | | |
|---|---|---|---|---|---|---|
| ID | NAME | STREET ADDRESS | CITY | STATE | ZIP | DAYTIME PHONE |
| 001 | BENJAMIN MARTIN | 19121 EVELYN AVENUE | SUNNYVALE | CA | 94086 | 408-376-5400 |
| ... | ... | ... | ... | ... | ... | ... |
| ... | ... | ... | ... | ... | ... | ... |
| 00N | ... | ... | ... | ... | ... | ... |

FIGURE 5

METHOD AND SYSTEM FOR PORTABLE DATA AGGREGATION

TECHNICAL FIELD

This application relates to a method and system for portable data aggregation.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Portable Document Format (PDF) is a standard for a secure and reliable distribution and exchange of electronic documents and forms. PDF is a file format that preserves fonts, images, graphics, and layout of a source document, regardless of the application and platform used to create it. Adobe® PDF files are compact and complete, and can be shared, viewed, and printed by anyone with free Adobe Reader® software.

The data contained in several PDF forms may be aggregated by exporting field data from the several PDF forms into a spreadsheet. For example, a separate row in a spreadsheet may store fields' values of an original PDF form. Conversely, a separate column may store values associated with one particular field of several original PDF forms. The data from several PDF forms may also be exported into a database, where a database record may represent data associated with a separate PDF form.

When data from a plurality of PDF forms is aggregated into a spreadsheet or is imported into a database, a user may no longer have an ability to view each form's data in a visually rich presentation as part of the PDF form that it originally came from.

BRIEF DESCRIPTION OF DRAWINGS

Embodiments are illustrated by way of example and not limitation in the figures of the accompanying drawings, in which like references indicate similar elements and in which:

FIG. 4 illustrates an original electronic form, in accordance with an example embodiment; and FIG. 4 illustrates a summary sheet, in accordance with an example embodiment.

DETAILED DESCRIPTION

Figure 1:
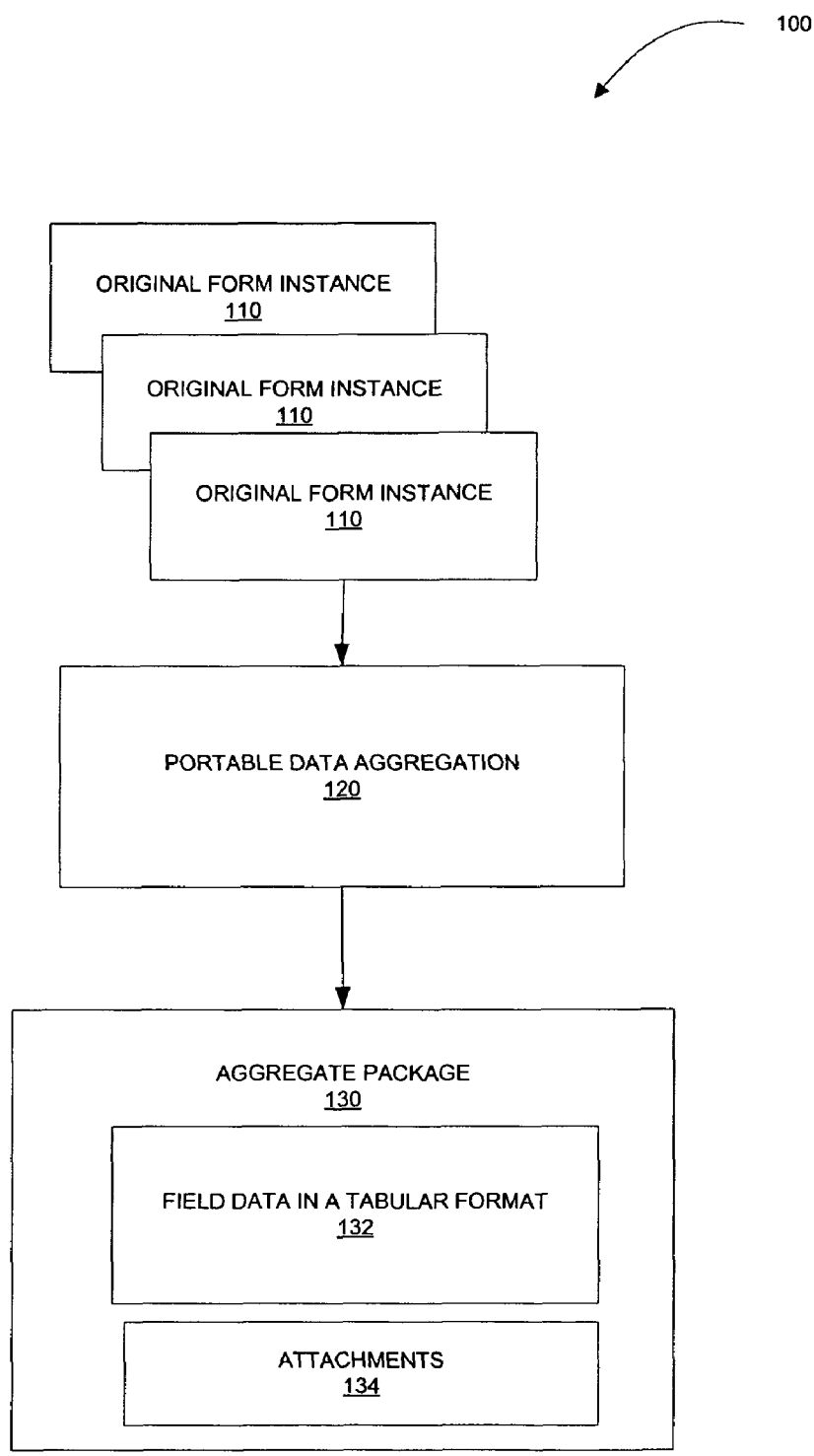
FIG. 1 is a block diagram showing an architecture within which a method and system to aggregate data from several electronic forms into a portable format may be implemented, in accordance with an example embodiment.

In an example embodiment, a method and system are provided to aggregate data from several original electronic forms (e.g., several instances of an original electronic form) into a single file container. It will be noted, that, for the purposes of this description, the terms "form" and "electronic form" may be used interchangeably. The resulting aggregate package (e.g., a single PDF file or a plurality of associated files) may include an aggregate representation of field data associated with the several original electronic forms, such that field data associated with one electronic form is presented to a viewer as one record, e.g., in a tabular format. The aggregate representation of field data associated with the several original electronic forms may be, in one embodiment, in a form of a summary sheet. Furthermore, the visually rich representation of an original electronic form may be preserved by saving characterizations of the original electronic form as part of the aggregate package. In one example embodiment, where an aggregate package is a PDF file, the characterizations of an original electronic form may be saved as an attachment associated with the PDF file.

In an example embodiment, a workflow of an electronic form begins by an "initiator" (e.g., a person or an automated process) sending an original electronic form (e.g., a blank electronic form) to people who need to fill it out. The original electronic form may include metadata indicating that all instances of the original electronic form are associated with a particular workflow. When each filled-in original form instance is returned to the initiator and opened utilizing an associated viewer application, the metadata may be discovered and the user may be prompted to indicate whether this form instance should be added to an aggregate package. An example aggregate package, sometimes referred to as a dataset or an aggregate dataset, may include a container file that serves as a container for each of the aggregated form instances, which may be inserted as attachments. An initiator may be provided with a visual display that shows a tabulated view of all form instances in the dataset, e.g., a tabulated view or a list view. A user may be permitted to open an original form instance for inspection from within the tabulated view by performing a predetermined control action. A control action may be, for example, a user action such as a single or a double click on a row representing field data of a particular instance of the original form. In an example embodiment, a control button may be provided to permit a user to view a form instance associated with a selected row. A user may also be permitted to remove any form instance from the dataset by deleting the corresponding attachment.

Thus, the system, in an example embodiment, may be configured to aggregate data associated with various collected instances of the original form and to render the aggregated form data in a tabular format (or some other format) or in an aggregated or collected manner, and also to permit a user to view a selected instance of the original form in its original visually rich format. Furthermore, the system may be configured to permit a user to remove a particular instance of the original form from the aggregate package, such that its form field data presented in an aggregated or collected manner, as well as the associated instance of the original form, are removed from the aggregate package. In an example embodiment, the view and remove operations may be performed in a drag and drop manner. An example architecture of a system to aggregate data is illustrated in FIG. 1.

FIG. 1 shows an architecture 100, within which a method and system to aggregate data from several electronic forms into a portable format may be implemented, in accordance with an example embodiment. In the context of the architecture 100, in an example embodiment, multiple instances 110 of an original electronic form are received and processed by a portable aggregation logic 120. The portable aggregation logic 120 may be configured to access an original form 110 and detect that the original form 110 includes an associated data (e.g., workflow metadata) indicating that the original form 110 may be aggregated with other forms or form instances associated with the same workflow. Workflow metadata, in one embodiment, may include a workflow identifier so as to enable association of the form with a workflow description. The portable aggregation logic 120 may also be configured to determine a location of an existing aggregate package 130 associated with the workflow and selectively add the form data into the aggregate package 130. It will be noted that, in an example embodiment, the portable aggregation logic 120 may be configured to determine that a target aggregate package for a particular workflow does not exist and, in response to this determination, generate a target aggregate package (e.g., aggregate package 130).

Thus, the processing by the portable aggregation logic 120, in an example embodiment, may result in a newly generated aggregate package 130 or in an aggregate package 130, where data associated with one or more original forms 110 has been selectively added. The aggregate package 130, in an example embodiment, comprises field data 132 obtained from one or more original forms 110. The field data in the aggregate package 130 may be presented to a user in a tabular format, e.g., where a particular row corresponds to field data from a particular original form 110. In an example embodiment, where the forms 110 are different instances of a single original form, a particular column in the tabular representation of form field data in the aggregate package may correspond to values associated with a particular field in the original form.

The aggregate package 130, in an example embodiment, further comprises original forms 110 saved as attachments 134. A system for portable data aggregation may be configured, in an example embodiment, to receive a control action associated with a row in a tabular representation corresponding to a particular original form or a particular original form instance. The system may then display a representation of the associated original form in a visually rich original format. A control action may be, for example, a click, an actuating of a control button, etc.

It will be noted that, as mentioned above, the portable data aggregation 120 may be performed on multiple instances of a particular original form, as well as on a plurality of heterogeneous electronic forms, where different electronic forms received by the portable data aggregation logic 120 may have different form fields, different presentation characteristics, as well as different form field values. An example system to aggregate data from a plurality of electronic form instances is described with reference to FIG. 2.

Figure 2:
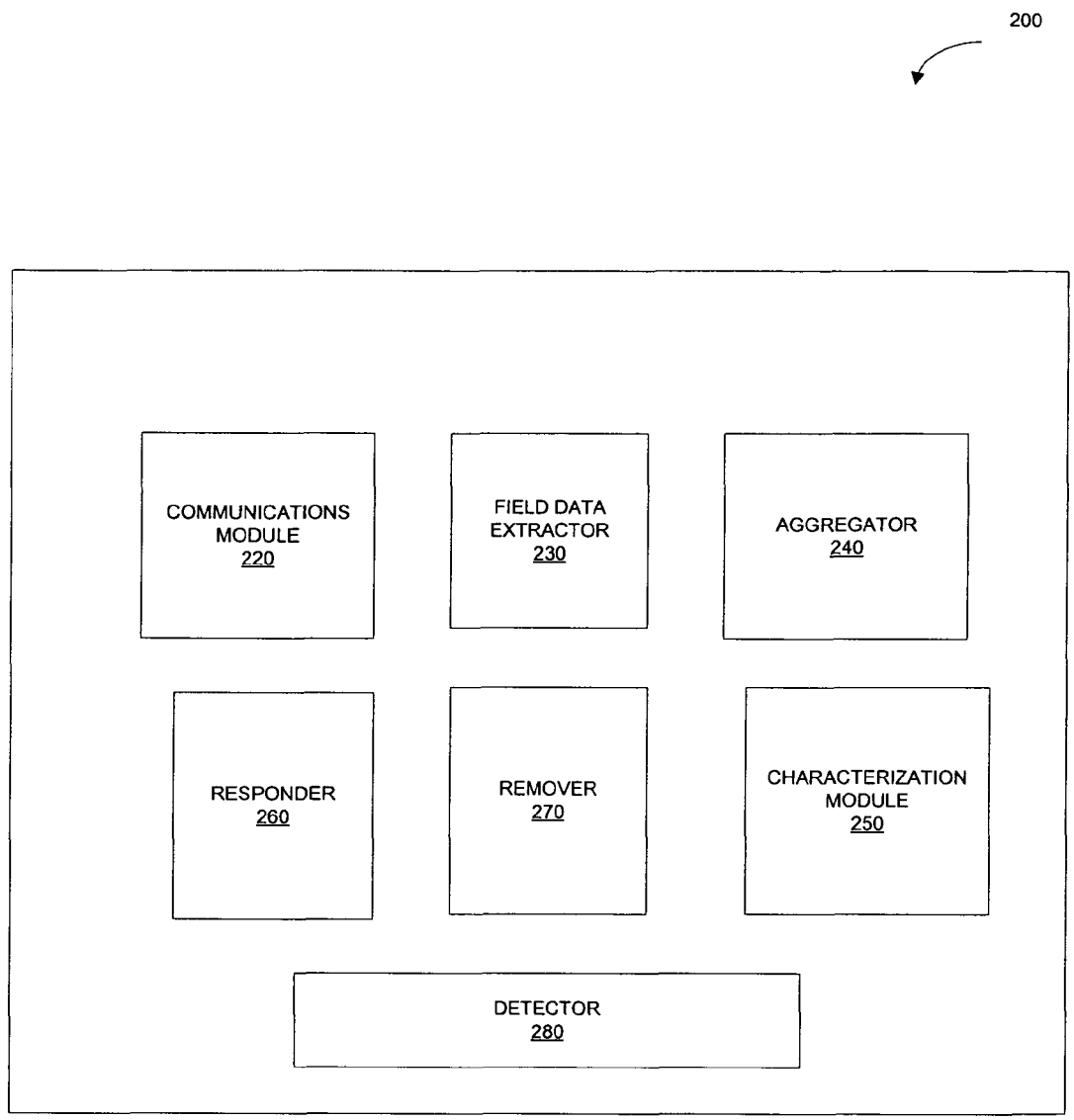
FIG. 2 is a block diagram illustrating a system, in accordance with an example embodiment, to aggregate a set of collected electronic forms into one aggregate package.

FIG. 2 shows a block diagram illustrating a system 200, in accordance with an example embodiment, to aggregate a set of collected electronic forms into one aggregate package. The system 200, in an example embodiment, comprises a communications module 220, a field data extractor 230, an aggregator 240 and a characterization module 250. The communications module 220 may be configured to receive multiple electronic forms. The received electronic forms may be, in one example embodiment, multiple instances of an original electronic form. In another example embodiment, the received forms may be instances of different electronic forms.

The communications module 220 may be configured to cooperate with the field data extractor 230, which, in turn, may be configured to extract field data from each one of the received electronic forms and to provide the extracted data to the aggregator 240. The aggregator 240 may be configured to associate the extracted field data with an aggregate package. The aggregator 240 may also be configured to generate a tabular representation of the extracted field data.

The characterization module 250 may be configured to associate a characterization of a form received by the communications module 220 with the aggregate package. In one example embodiment, the characterization of a form received by the communications module 220 may be added into an aggregate package by saving the received electronic form as an attachment associated the aggregate package. In another embodiment, the characterization may be associated with an aggregate package, for example by association data included within the application package which points to a storage location at which the characterization is stored. The saved characterization of a form may be utilized to preserve visual presentation of the received electronic form.

The system 200, in an example embodiment, may further include a responder 260 and a remover 270. The responder 260 may be configured to permit viewing of an original representation of a received form from the aggregate package. The remover 270 may be configured to permit removing all representations of a particular electronic form from the aggregate package.

As mentioned above, a system for portable data aggregation may be configured to detect metadata within an electronic form indicating that the electronic form is associated with a particular workflow. Thus, the system 200 may include a detector 280 to detect automatically that an electronic form is part of a particular workflow. In one example embodiment, the detector 280 may be configured to perform the detecting of whether an electronic form is part of a particular workflow after the electronic form is opened for viewing by an associated application. In an alternative embodiment, the detector 280 may be configured to periodically scan a predetermined destination (e.g., a particular folder or directory, an inbox associated with initiator's electronic mail client, etc), notify the initiator of any newly detected electronic forms associated with a workflow, and then automatically add the electronic forms associated with a workflow to a determined destination aggregate package. Various operations performed by the system 200, according to an example embodiment, may be described with reference to FIG. 3.

Figure 3:
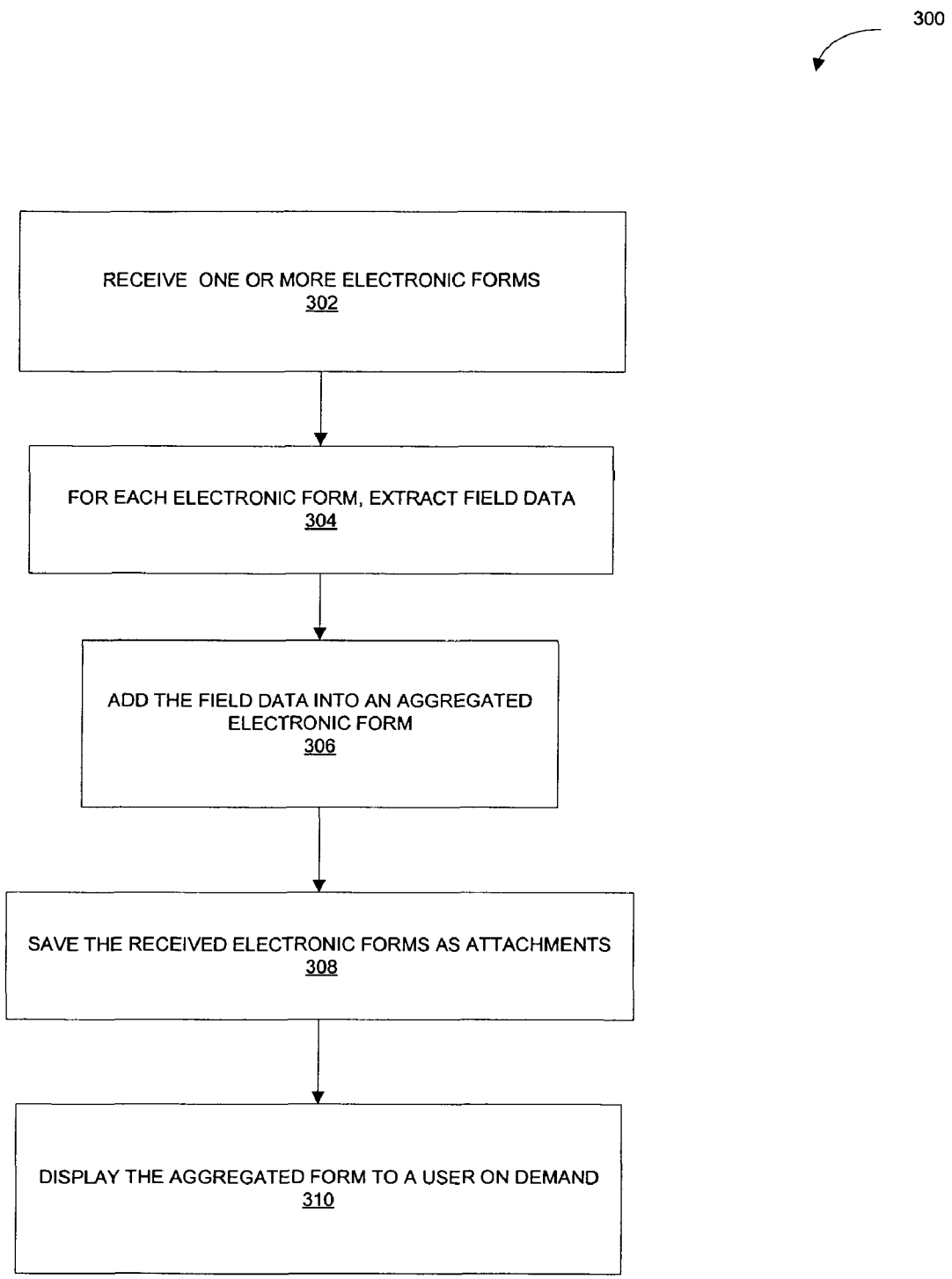
FIG. 3 is a flow chart illustrating a method to aggregate a set of collected electronic forms, in accordance with an example embodiment.

FIG. 3 is a flow chart illustrating a method 300 to aggregate a set of collected electronic forms, in accordance with an example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the method 300 may be performed by the various modules discussed above with reference to FIG. 2. Each of these modules may comprise processing logic.

As shown in FIG. 3, the method 300 commences with the communications module 220 from FIG. 2 receiving one or more electronic forms at operation 302. At operation 304, the field data extractor 230 extracts field data from the received electronic forms, and the aggregator 240 adds the field data into an aggregate package at operation 306. The aggregator 240 may then pass control to the characterization module 250.

At operation 308, the characterization module 250 may save the received electronic forms as attachments associated with the aggregated form. The resulting aggregated form (e.g., in an example embodiment of a summary sheet as discussed below) may be displayed to a user on demand, at operation 310. An example original form that may be processed utilizing the method 300 is discussed with reference to FIG. 4A.

FIG. 4 illustrates an original electronic form 400, in accordance with an example embodiment. The electronic form 400, entitled "Holiday Vacation Form", as shown in FIG. 4, comprises a plurality of data fields that may receive field values in response to a user input. In the example "Holiday Vacation Form" 400, a "Name" field 402 has an associated field value "Benjamin Martin" 404. A "Street Address" field 406 has an associated field value "19121 Evelyn Avenue" 408. A "City" field 410 has an associated field value "Sunnyvale" 412. A "ZIP" field 414 has an associated field value "94086" 420. Finally, a "Daytime Phone" field 422 has an associated field value "408-376-5400" 424.

As mentioned above, an electronic form, e.g., the "Holiday Vacation Form" 400, may have embedded metadata such that an electronic form (or an instance of an electronic form) may be identified by the system as part of a specific workflow. It will be noted, that, while such embedding of metadata may enhance user experience with electronic forms, the presence of metadata in a form is not required in order to utilize a system and method for portable data aggregation. In an example embodiment, a user may be permitted to select a plurality of electronic forms found in a file system, and request that the selected electronic forms be aggregated into an aggregate package, e.g., as shown in FIGS. 4 and 5.

An example summary sheet 500 is illustrated in FIG. 5. As shown in FIG. 5, the field values from the "Holiday Vacation Form" 400 appear in a single row 510 of the summary sheet 500.

It will be noted that, although some example embodiments of the invention have been described in the context of PDF electronic forms, the techniques herein may be utilized advantageously with a variety of data presentation formats that are suitable for providing electronic forms to users. In one example embodiment, an aggregate package may be implemented as an eXtensible Markup Language (XML) file.

As discussed above, the system to aggregate a set of collected electronic forms into an aggregate package may receive electronic forms from users who filled out a distributed form. In one example embodiment, the system may be configured to receive just field data associated with a filled out electronic form (e.g. in the XML format), as opposed to the whole completed form (e.g. a PDF file). The returned XML file may then be associated with an appropriate aggregate package. The XML data may be included, in one embodiment, into the aggregate package as one of the records in the tabulated view. When the system detects a user's request to display a complete form for that particular record, the system may open a copy of a blank form, import the XML data into the blank form, and display the resulting form to the user.

Figure 6:
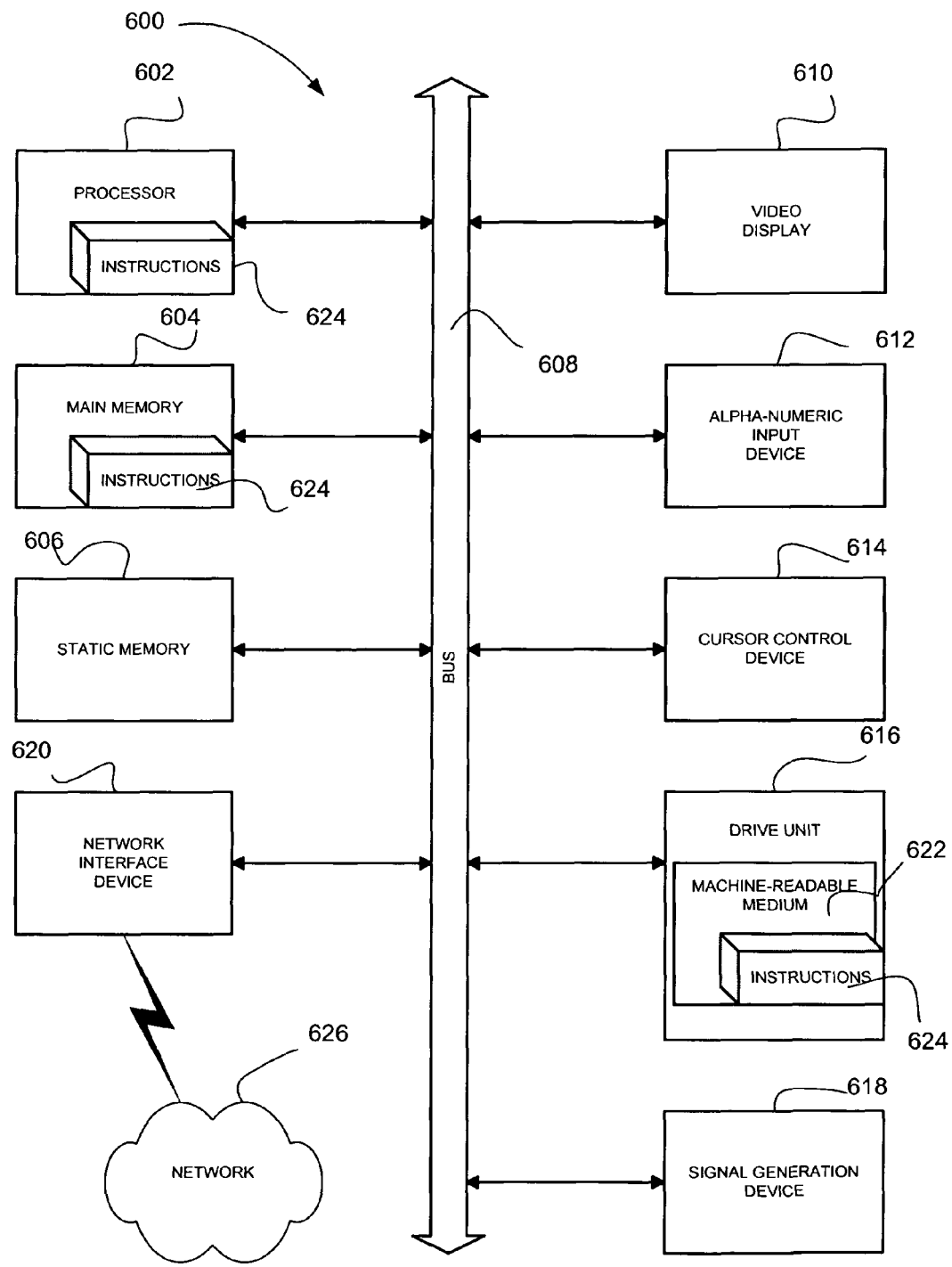
FIG. 6 illustrates a diagrammatic representation of a machine in the example form of a computer system within which a set of instructions, for causing the machine to perform any one or more of the methodologies discussed herein, may be executed.

FIG. 6 shows a diagrammatic representation of a machine in the example electronic form of a computer system 600 within which a set of instructions, for causing the machine to perform any one or more of the methodologies discussed herein, may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an MP3 player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620 utilizing any one of a number of well-known transfer protocols (e.g., HTTP).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Such medium may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware.

Thus, a method and system for portable data aggregation have been described. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A system including a processor and memory, the system comprising:
 a communications module to receive an electronic form from a plurality of electronic forms, the electronic form comprising field data and having a visual representation viewable by a user;

an extractor to extract the field data from the electronic form to be included in an aggregate package, the aggregate package comprising an aggregated electronic form and a plurality of attachments, the aggregated electronic form comprising a plurality of records, each record from the plurality of records in the aggregated electronic form storing field data of a respective source electronic form, each record in the aggregated electronic form being linked to an attachment comprising a visual representation of a respective source electronic form, each attachment being from the plurality attachments;

an aggregator to add the field data as a new record into the aggregated electronic form of the aggregate package; and a characterization module to associate an attachment storing the visual representation of the electronic form with the new record in the aggregate electronic form of the aggregate package.

2. The system of claim 1, further comprising a responder to:
receive a control action associated with the new record in the aggregate electronic form; and
display a the stored visual representation of the electronic form in response to the control action, utilizing the attachment associated with the new record.

3. The system of claim 2, wherein the control action is a click on the tabular representation of the form data.

4. The system of claim 1, wherein:
the communications module is to receive an additional electronic form;
the extractor is to extract additional field data from the additional electronic form;
the aggregator is to add the additional field data as an additional record into the aggregate electronic form of the aggregate package; and
the characterization module is to associate an additional attachment storing a visual representation of the additional electronic form with the additional record in the aggregate electronic form.

5. The system of claim 4, further comprising a remover to:
receive a further control action associated with the additional record; and
remove the additional record and the additional attachment form from the aggregate package in response to the further control action.

6. The system of claim 1, wherein the electronic form is in a Portable Document Format (PDF).

7. The system of claim 1, wherein the aggregate package is a dataset, the dataset comprising a container file to serve as a container for the electronic form.

8. The system of claim 1, wherein the electronic form includes metadata to indicate that the electronic form is associated with the aggregate package.

9. A method comprising:
receiving an electronic form from a plurality of electronic forms, the electronic form comprising field data and having a visual representation viewable by a user;
extracting the field data from the electronic form to be included in an aggregate package, the aggregate package comprising an aggregated electronic form and a plurality of attachments, the aggregated electronic form comprising a plurality of records, each record from the plurality of records in the aggregated electronic form storing field data of a respective source electronic form, each record in the aggregated electronic form being linked to an attachment comprising a visual representation of a respective source electronic form, each attachment being from the plurality attachments;
adding the field data as a new record into the aggregated electronic form of the aggregate package; and
associating an attachment storing the visual representation of the electronic form with the new record in the aggregate electronic form of the aggregate package.

10. The method of claim 9, further comprising:
receiving a control action associated with the new record in the aggregate electronic form; and
displaying a the stored visual representation of the electronic form in response to the control action, utilizing the attachment associated with the new record.

11. The method of claim 10, wherein the control action is clicking on the tabular representation of the form data.

12. The method of claim 9, further comprising:
receiving an additional electronic form;
extracting additional field data from the additional electronic form;
adding the additional field data as an additional record into the aggregate electronic form of the aggregate package; and
associating an additional attachment storing a visual representation of the additional electronic form with the additional record in the aggregate electronic form.

13. The method of claim 12, further comprising:
receiving a further control action associated with the additional record; and
removing the additional record and the additional attachment form from the aggregate package in response to the further control action.

14. The method of claim 9, further comprising presenting the aggregate package in a Portable Document Format (PDF).

15. The method of claim 9, further comprising detecting metadata in the electronic form to indicate that the electronic form is associated with the aggregate package.

16. A machine-readable medium having instruction data to cause a machine to:
receive an electronic form from a plurality of electronic forms, the electronic form comprising field data and having a visual representation viewable by a user;
extract the field data associated with the electronic form, the field data from the electronic form to be included in an aggregate package, the aggregate package comprising an aggregated electronic form and a plurality of attachments, the aggregated electronic form comprising a plurality of records, each record from the plurality of records in the aggregated electronic form storing field data of a respective source electronic form, each record in the aggregated electronic form being linked to an attachment comprising a visual representation of a respective source electronic form, each attachment being from the plurality attachments;
add the field data as a new record into the aggregated electronic form of the aggregate package; and
associate an attachment storing the visual representation of the electronic form with the new record in the aggregate electronic form of the aggregate package.

* * * * *

UNITED STATES PATENT AND TRADEMARK OFFICE
CERTIFICATE OF CORRECTION

| | | |
|---|---|---|
| PATENT NO. | : 7,870,477 B2 | Page 1 of 1 |
| APPLICATION NO. | : 11/495833 | |
| DATED | : January 11, 2011 | |
| INVENTOR(S) | : Roberto Perelman et al. | |

It is certified that error appears in the above-identified patent and that said Letters Patent is hereby corrected as shown below:

In column 7, line 11, in Claim 1, after "plurality" insert -- of --.

In column 7, line 23, in Claim 2, after "display" delete "a".

In column 8, line 5, in Claim 9, after "plurality" insert -- of --.

In column 8, line 14, in Claim 10, after "displaying" delete "a".

In column 8, line 56, in Claim 16, after "plurality" insert -- of --.

Signed and Sealed this
Twenty-second Day of March, 2011

David J. Kappos
*Director of the United States Patent and Trademark Office*